United States Patent [19]

Monahan et al.

[11] Patent Number: 5,159,597
[45] Date of Patent: Oct. 27, 1992

[54] GENERIC ERROR RECOVERY

[75] Inventors: Christopher J. Monahan; Mary L. Monahan; Dennis L. Willson, all of Tucson, Ariz.

[73] Assignee: International Business Machines Corporation, Armonk, N.Y.

[21] Appl. No.: 525,927

[22] Filed: May 21, 1990

[51] Int. Cl.⁵ .......................................... G06F 11/00
[52] U.S. Cl. .................................. 371/16.1; 371/7; 371/16.5
[58] Field of Search ............... 371/7, 16.5, 16.1, 29.1, 371/17, 18

[56] References Cited

U.S. PATENT DOCUMENTS

| | | | |
|---|---|---|---|
| 4,108,360 | 8/1978 | Beismann | 371/16.5 |
| 4,419,726 | 12/1983 | Weidner | 364/200 |
| 4,661,954 | 4/1987 | Harding et al. | 371/37 |
| 4,815,076 | 3/1989 | Denney et al. | 371/11 |
| 4,866,712 | 9/1989 | Chao | 371/7 X |
| 4,912,711 | 3/1990 | Shiramizu | 371/16.1 |
| 4,922,491 | 5/1990 | Coale | 371/16.5 X |

FOREIGN PATENT DOCUMENTS 0127241 3/1978 Japan .

OTHER PUBLICATIONS

"Host Selectable Subsystem Error Reporting/Error Recovery For Development Testing", IBM TDB, vol. 13, No. 11, Apr. 1989, pp. 83-86.
G. I. Finley, "Invoking Error Recovery Procedures", Jan. 1982, IBM Tech. Discl. Bulletin, vol. 24, No. 8, pp. 4051-4052.
R. D. Batiste, et al, "Generic Alerts for SDLC Level Errors", Aug. 1988, IBM Tech. Discl. Bulletin, vol. 31, No. 3, pp. 395-397.

Primary Examiner—Robert W. Beausoliel
Assistant Examiner—Ly V. Hua
Attorney, Agent, or Firm—Manny W. Schecter

[57] ABSTRACT

An error recovery subsystem which can be easily modified for use with any physical hardware which is being monitored is disclosed. The error recovery subsystem employs a user editable file including the rules for defining the system state, the error states, and the sequences of recovery actions to be taken depending upon the comparison between the system state and the error states. The rules for defining the system state, include don't care variables, and the sequences of recovery actions are specified using an index into a set of elemental recovery actions. Because the system state, error state, and sequence of recovery actions are defined in a user editable file modifications to the error recovery scheme can be made without recompiling the error recovery subsystem program code. Such modifications to the error recovery subsystem may therefore be made on a real time basis. A method for recovering from an error and a program product therefore are also disclosed.

11 Claims, 7 Drawing Sheets

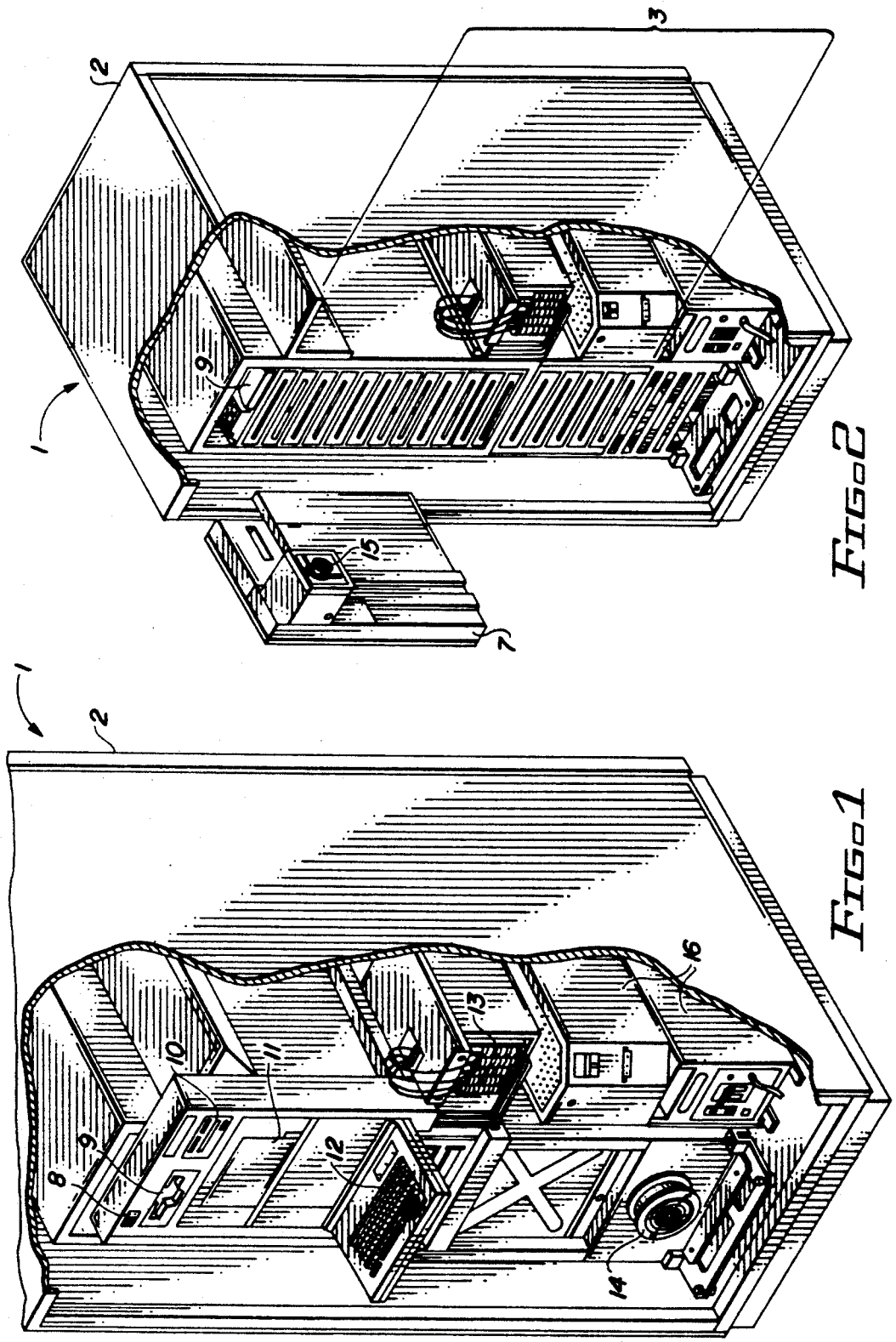

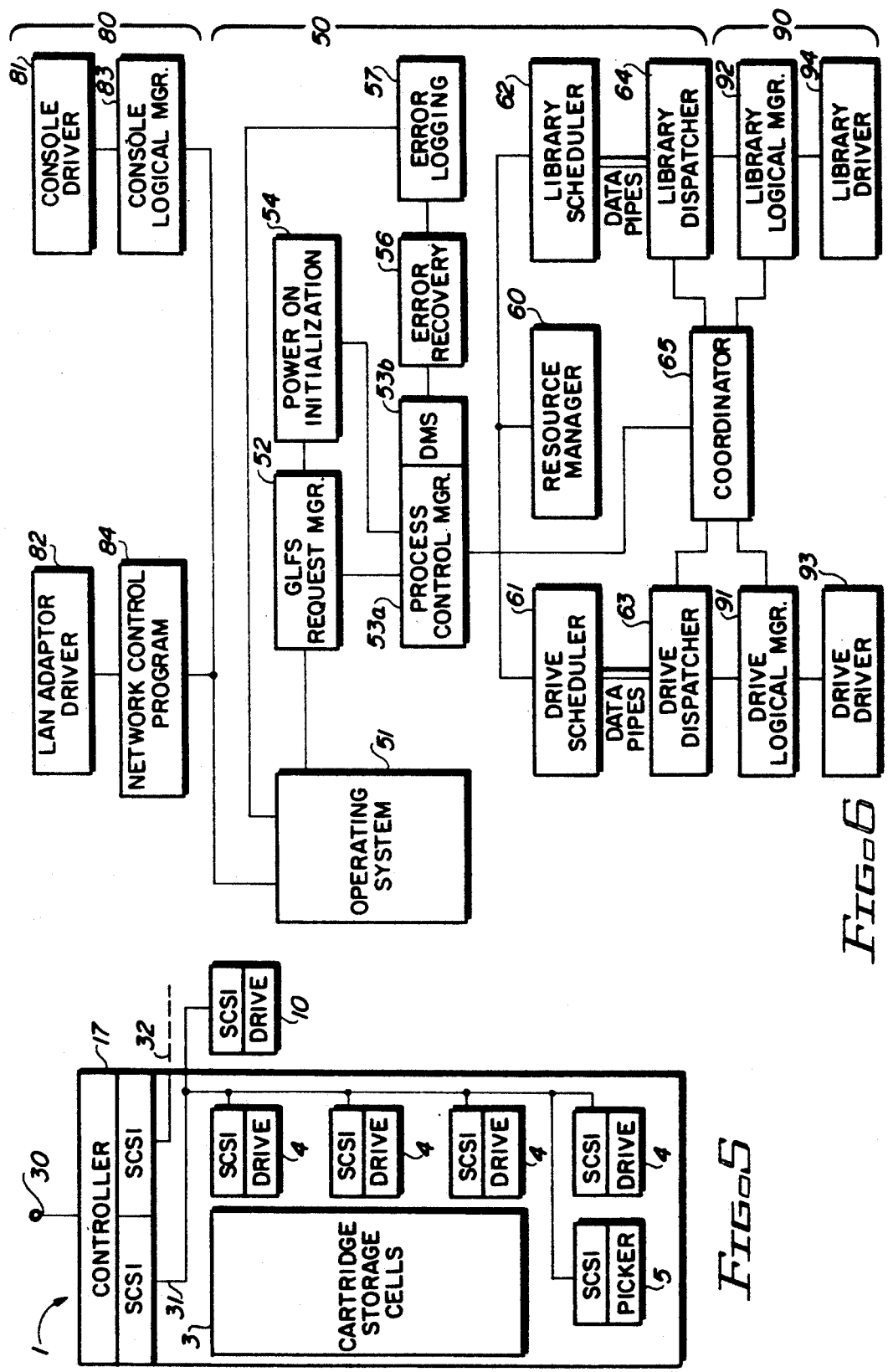

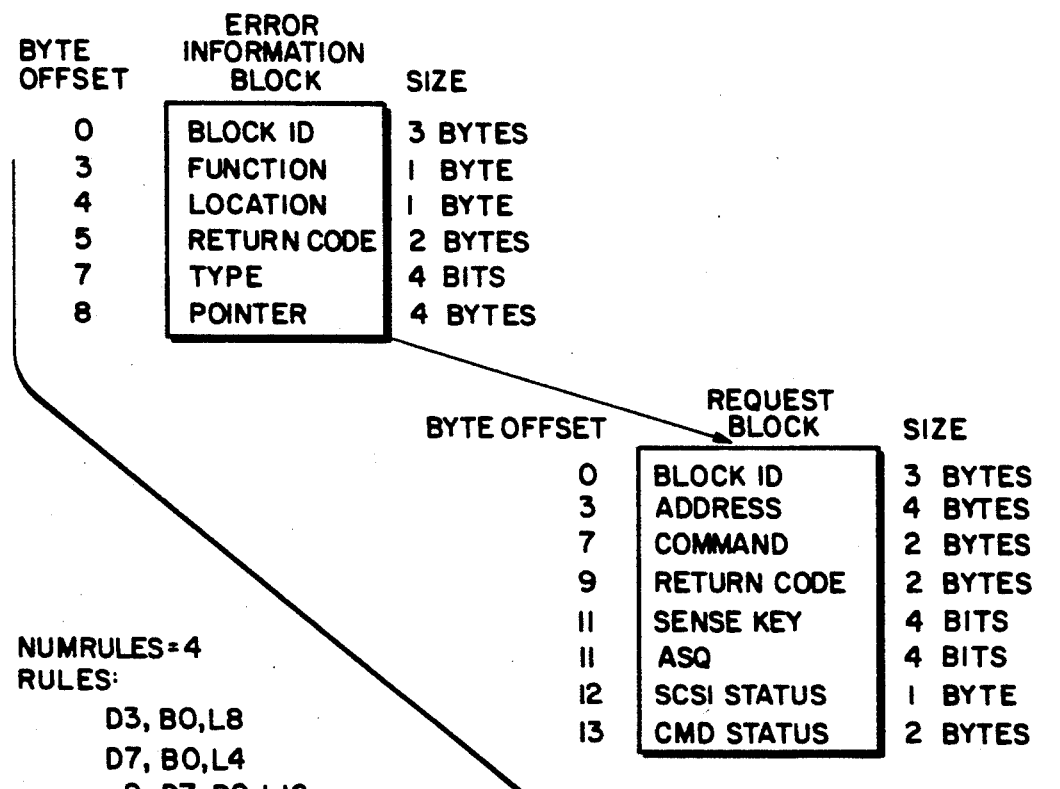
FIG. 7
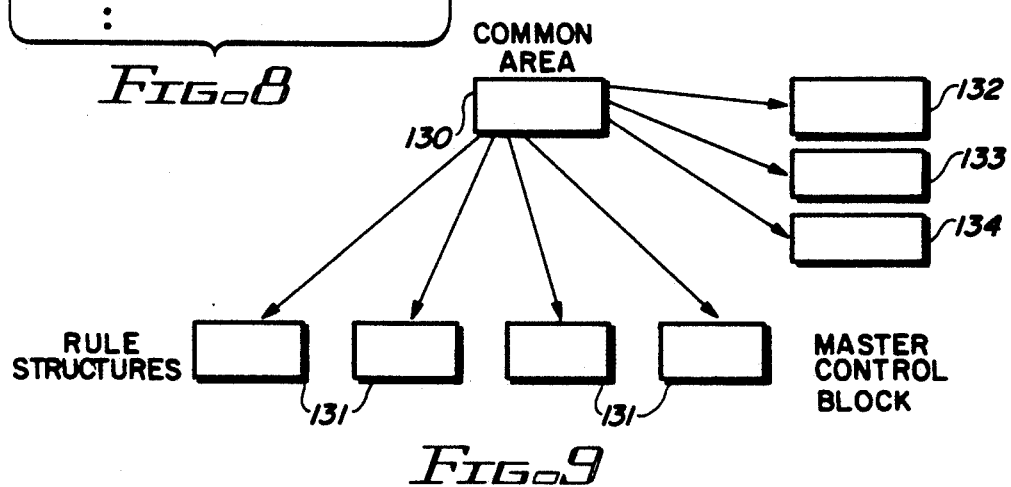
FIG. 8
FIG. 9

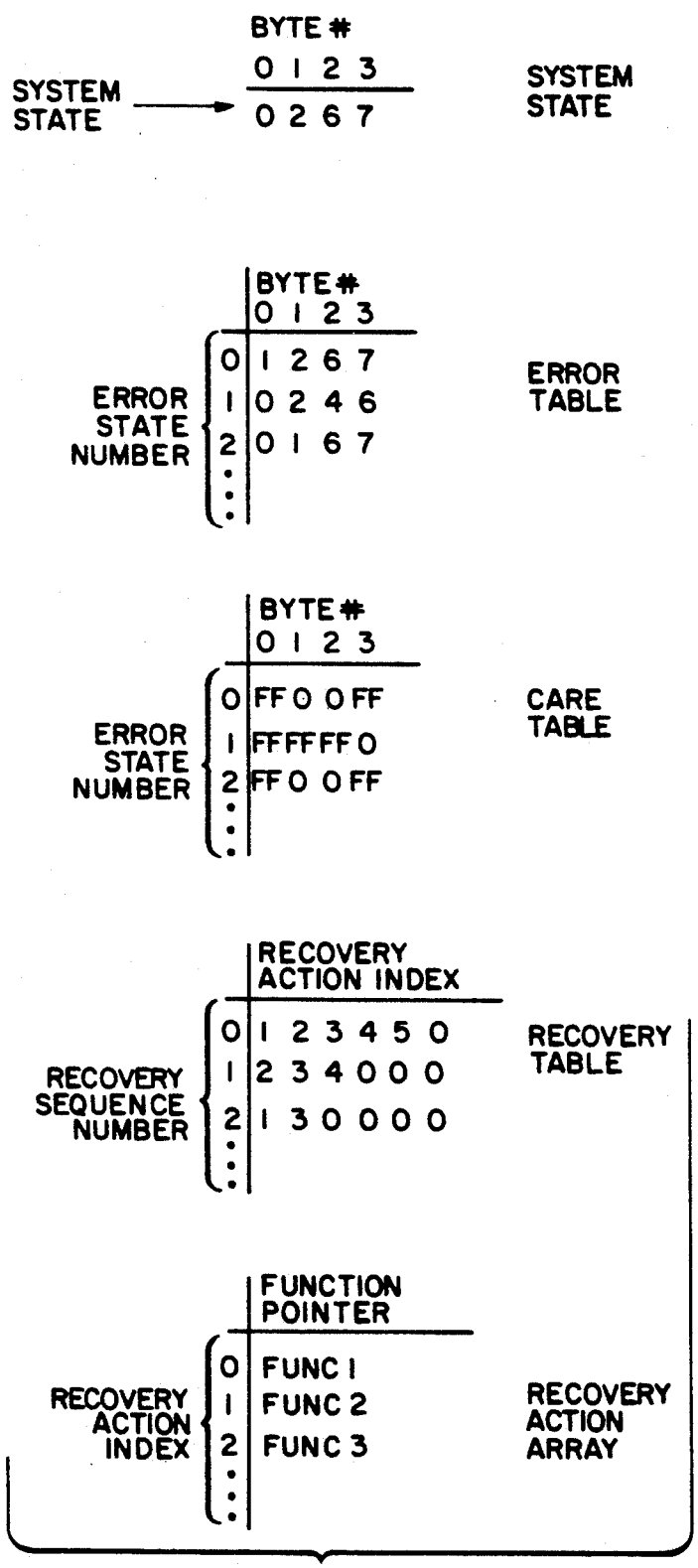
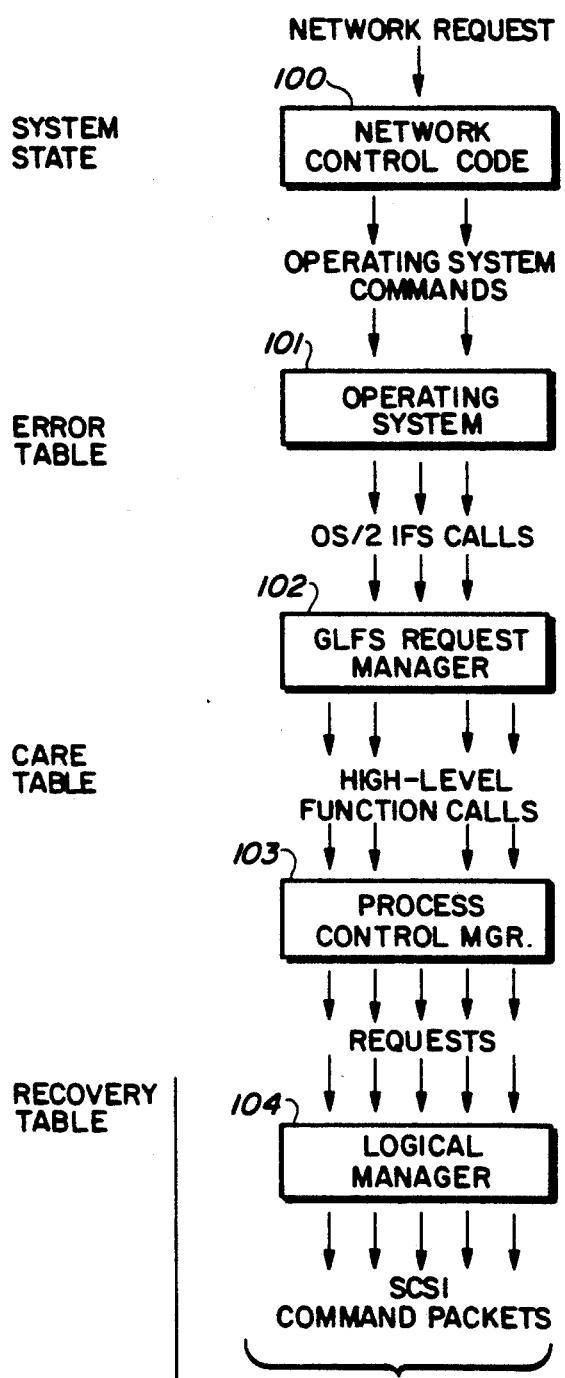
FIG. 10
FIG. 11

TRANSLATE

COMPARE

RECOVER

GENERIC ERROR RECOVERY

BACKGROUND OF THE INVENTION

1. Field of the Invention

This invention relates to the recovery from a software or hardware error in a data processing system. More particularly, the invention relates to an error recovery subsystem which is easily reconfigured, and a method for recovering from an error and a program product therefor.

2. Description of the Related Art

Computer or data processing systems typically comprise a plurality of hardware components such as processors, memory devices, input/output devices and telecommunications devices. In addition, such systems also comprise a plurality of software components such as operating systems, application support systems, applications, processes, data structures, etc. A fault or an error in any one of these hardware or software components can invalidate the results of a computer system action. Much effort has therefore been invested in discovering and correcting such errors.

When an error is discovered in a data processing system, a specific recovery action, or series of actions, is generated to restore the system to working order. These actions include restarting a software process, reinitializing a data area, rebooting a central processing unit, resetting a piece of hardware, etc. In a complicated system, it is often difficult to determine in real time which basic hardware or software components of the system are at fault and require the attention of recovery actions. Because the availability of the entire data processing system is dependent upon a rapid reacquisition of full working status, an efficient strategy is required to minimize system recovery time.

One known method for recovery from a detected error is to examine all known system variables to precisely determine the state of the data processing system. The actual system state is then compared to all possible system states for which a sequence of recovery actions is known. The possible system states are referred to as "error states" and are retained in system memory. If the actual system state matches an error state, the sequence of recovery actions associated with such error state is invoked.

The detailed logic necessary to implement an error recovery subsystem is complex and often requires a significant development effort. The large number of system variables in a data processing system results in an immense number of system states which must be detectable, and in an immense number of error states which must be retained in memory. Moreover, although new error conditions are frequently identified during the life of the data processing system, additions and modifications to the logic of an error recovery subsystem are very difficult and expensive. For example, the logic used to program the system must be redesigned to retain and utilize new error states and their associated sequences of recovery actions as they are discovered. In addition, redesign is necessary as the appropriate sequence of recovery actions for a given error state changes due to aging of the data processing system components. The design and maintenance of error recovery subsystems thus tend to be costly and unresponsive to the experience gained during the life of a data processing system.

One additional strategy used to minimize recovery time for data processing systems is to attempt recovery at the level of the simplest, most elementary component which could have caused the observed error condition. If reinitialization of that lowest level component fails to clear the error condition, a component at a next higher level (having a larger and more comprehensive function) is reinitialized. If the error is still not cleared, components at ever higher and higher levels are reinitialized until the error condition is cleared. If, after a predetermined time-out period or after the highest level component possibly involved in the error is reinitialized, and the error condition remains, the error recovery subsystem is deemed to have failed and an alarm is used to alert personnel to take corrective action. This type of multi-level procedural strategy for recovering from errors is known as a multi-staged error recovery system.

U.S. Pat. No. 4,866,712 discloses an error recovery subsystem which is somewhat modifiable. The error recovery subsystem includes a user editable error table and a user editable action table. The error table has one entry for each possible error state and contains a count increment for each sequence of recovery actions that might be taken to correct that error condition. The action table includes action codes uniquely identifying each sequence of recovery actions and an error count threshold for each possible sequence of recovery actions. The subsystem accumulates error count increments for each possible sequence of recovery actions and, when the corresponding threshold is exceeded, initiates the associated sequence of recovery actions. Because the error table and action table are user editable, the subsystem is easily modified to account for new error states, to associate a different known sequence of recovery actions with a particular error state, and to adjust the error count thresholds. It is unclear, however, how to cope with the very large number of system variables in determining the system state. Also, although one can change the sequence of recovery actions (from one specified sequence to another specified sequence) associated with an error state by changing the action code, there is no simple way to create a new sequence of recovery actions as the system ages. Instead, the logic must be redesigned. Even if the error recovery system is implemented as software/microcode programming, such program must be modified and then recompiled as a new code load before installation, thereby slowing system maintenance. In addition, the particular error recovery subsystem disclosed is limited to multi-staged error recovery systems.

SUMMARY OF THE INVENTION

In view of the foregoing, the principal object of this invention is an improved error recovery subsystem for data processing systems, and an improved method for recovering from an error and program product therefor.

Another object of this invention is an error recovery subsystem which reduces the complexity in defining the number of system states, and a method for recovering from an error and program product therefor.

Still another object of this invention is an error recovery subsystem which can be easily modified to account for changes in the configuration of a data processing system, a new definition of the system state, new error states, and new sequences of recovery actions required in response to an error condition.

These and other objects of this invention are accomplished by a generic error recovery subsystem. The error recovery subsystem is generic in that it can be easily modified for use with any hardware which is being monitored. The error recovery subsystem employs a user editable file including the rules for defining the system state, the error states, and the sequences of recovery actions to be taken depending upon the comparison between the system state and the error states. The error states include don't care variables to eliminate unnecessary bit comparisons between the system state and the error states. The sequences of recovery actions are specified using an index into a set of elemental recovery actions, thereby simplifying the addition of a new sequence of recovery actions. Because the system state, error state, and sequence of recovery actions are defined in a user editable file, modifications to the error recovery scheme can be made without recompiling the error recovery subsystem program code. Such modifications to the error recovery subsystem may therefore be made on a real time basis. A method for recovering from an error and a program product therefore are also disclosed.

The foregoing and other objects, features, and advantages of the invention will be apparent from the following more particular description of the preferred embodiment of the invention, as illustrated in the accompanying drawing.

BRIEF DESCRIPTION OF THE DRAWING

FIG. 1 is a front, perspective cut-away view of an optical disk library for implementing the present invention.

FIG. 2 is the same view as in FIG. 1 except that the console panel has been swung aside and the fan has been removed.

FIG. 5 is a schematic diagram of the optical disk library hardware of FIGS. 1-4.

FIG. 6 is a schematic block diagram of the system controller of the optical disk library of FIGS. 1-5.

FIG. 7 is a schematic block diagram of an error information block and a request block used in accordance with the present invention.

FIG. 8 is an example of the user editable data file contents using the structured reference language.

FIGS. 9 and 10 are schematic diagrams of the error recovery subsystem internal data structures created during initialization.

FIG. 11 is a flowchart of the operations of the system controller of an optical disk library in translating a network request received at its upper interface into SCSI command packets at its lower interface.

DESCRIPTION OF THE PREFERRED EMBODIMENT

Figure 4:
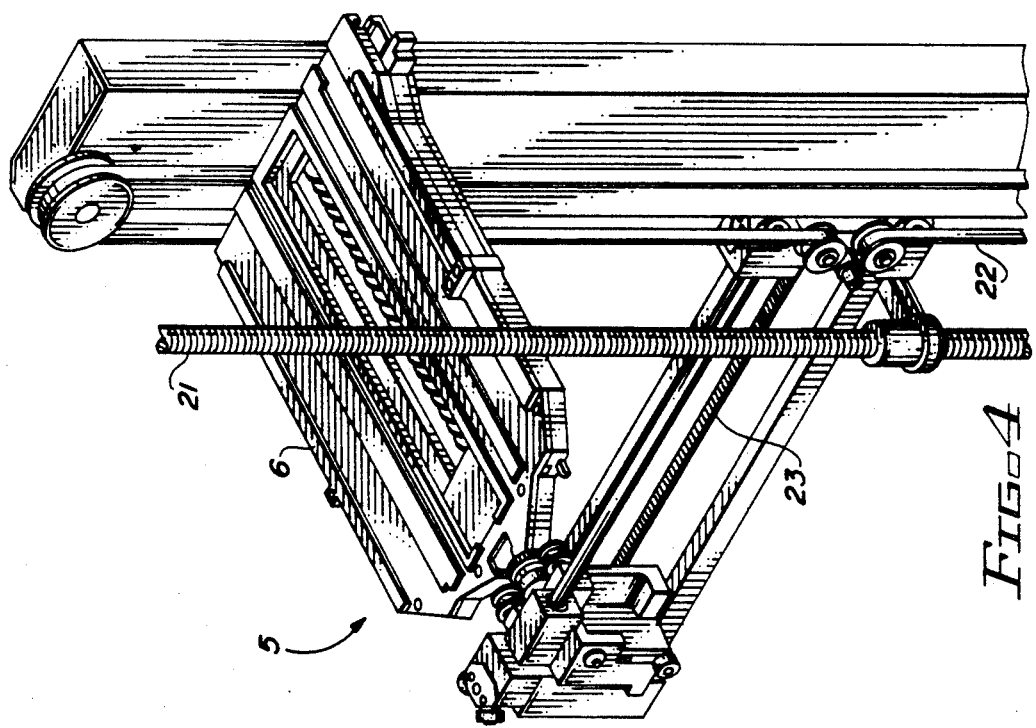
FIG. 4 is a magnified view of the robotic picker and gripper of FIG. 3.
Figure 3:
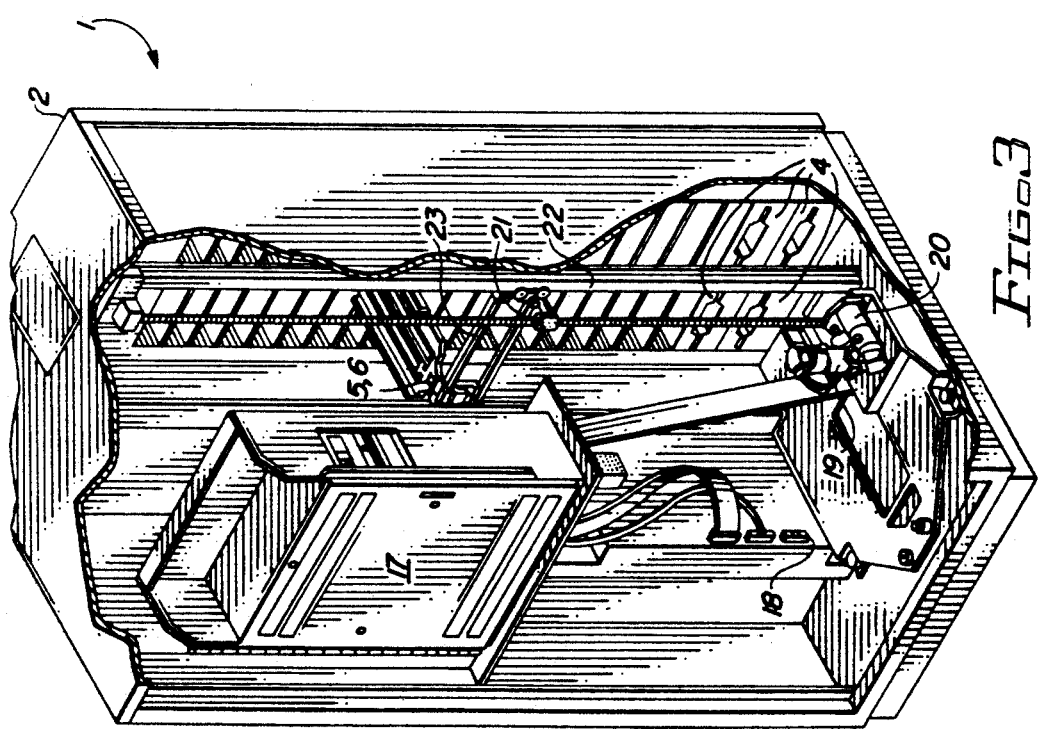
FIG. 3 is a rear, perspective cut-away view of the optical disk library of FIGS. 1 and 2.

Referring now more particularly to the drawing, like numerals denote like features and structural elements in the various figures. The generic error recovery subsystem will be described as embodied in an optical disk library, but could be implemented in any data processing system. Automated storage libraries include a plurality of storage cells for retaining removable data storage media, such as magnetic tapes, magnetic disks, or optical disks, a robotic picker mechanism, and one or more internal peripheral storage devices. Each data storage medium may be contained in a cassette or cartridge housing for easier handling by the picker. The picker operates on command to transfer the data storage media between the storage cells and the internal peripheral storage devices without manual assistance. Once a data storage medium is mounted in an internal peripheral storage device, data may be written to or read out from that medium for as long as the system so requires. Data is stored on a medium in the form of one or more files, each file being a logical data set. An optical disk library is a type of automated storage library.

Referring to FIGS. 1-4, various views of such an optical disk library is shown. The library 1 includes a housing 2 enclosing most of the working parts of the library and having front and rear door panels (not shown) for interior access. Library 1 further includes a plurality of optical disk storage cells 3 and a plurality of internal optical disk drives 4. Each storage cell 3 is capable of storing one optical disk having data recorded on one or both sides thereof. The data stored on each side of a disk is referred to as a "volume". In the preferred embodiment, library 1 includes 144 storage cells 3 arranged in two 72 storage cell columns and up to four optical disk drives 4. The optical disks may include ablative, phase-change, magneto-optic, or any other optical recording layers and may be read-only, write-once, or rewritable, as is known, so long as they are compatible with optical disk drives 4. In addition, the optical disks may be recorded in a spiral or concentric track pattern. The precise recording format is not part of the subject invention and may be any known in the art. A robotic picker 5 includes a single gripper 6 capable of accessing an optical disk in any of storage cells 3 or drives 4 and transferring such optical disks therebetween. In the preferred embodiment, the optical disks are configured in cartridges for easy handling by gripper 6 and are 5 and ¼ inch form factor disks, but in alternative embodiments could be any size compatible with drives 4 and gripper 6.

Although the front face of housing 2 is not shown in FIG. 1, certain portions of library 1 protrude through such front face of housing 2 for operator access. These portions are part of a console door 7 and include all or part of a power indicator/switch 8, an entry/exit slot 9, an external optical disk drive 10, a console 11, and a keyboard 12.

Console door 7 can be swung aside to allow access therebehind, when necessary, as shown in FIG. 2. Slot 9 is used for inserting optical disks to or removing optical disks from library 1. Commands may be provided by an operator to library 1, via keyboard 12, to have picker 5 receive an optical disk inserted at slot 9 and transport such disk to a storage cell 3 pr drive 4, or to have picker 5 retrieve an optical disk from a storage cell 3 or drive 4 and deliver such disk to slot 9 for removal from library 1. Console 11 allows an operator to monitor and control certain operations of library 1 without seeing inside housing 2. External optical disk drive 10, unlike drives 4, cannot be accessed by gripper 6. Drive 10 must instead be loaded and unloaded manually. Library 1 also includes an optical disk drive exhaust fan 14, an external disk drive exhaust fan 15, and power supplies 16.

Once library 1 is powered on, commands received at keyboard 12 are forwarded to a system controller 17. In the preferred embodiment, system controller 17 is an IBM PS/2 Model 80 personal computer using the OS/2 operating system. The IBM PS/2 model 80 personal computer includes main memory and one or more storage media, such as those in fixed or floppy disk drives. System controller 17 issues instructions to drives 4, external drive 10, and picker 5 as will be described. Drive controller cards 13 and picker 5 controller card 18 convert known small computer system interface (SCSI) command packets issued by system controller 17 into the electromechanical action of drives 4, external drive 10, and picker 5. The movement of picker 5 within library 1 is X-Y in nature. Movement in the vertical direction is driven by a vertical direction motor 19 and movement in the horizontal direction is driven by a horizontal direction motor 20. Motor 19 turns a lead screw 21 to move picker 5 vertically. Motor 20 turns belts 22 and 23 to move picker 5 horizontally. In addition, picker 5 may be rotated to bring either side of an optical disk within the grasp of gripper 6 to an upright position. The remaining physical features of library 1 are not shown in the drawing, or are shown but not labeled for the purpose of simplification, but are well known.

Referring to FIG. 5, the system connections of library 1 will now be described. System controller 17 is attached to one or more host system processors 30 to receive input therefrom and to transmit output thereto. System processor 30 can be a host central processing unit (CPU), such as an IBM 3090 mainframe processor using the MVS or VM operating system or IBM AS/400 midrange computer using the OS/400 or AIX operating system, or a network of processors, such as IBM PS/2 personal computers using the OS/2 or DOS operating system and arranged in a local area network (LAN). The connections to system processor 30 are not shown, but are well known. If system processor 30 is an IBM 3090 mainframe processor, the connection could be made using an IBM System/370 channel attachment according to the interface described in IBM Document #SA22-7091-00, "IBM Channel-to-Channel Adapter", June, 1983, IBM Document #GA22-6974-09, "IBM System/360 and System 370 I/O Interface Channel to Control Unit Original Equipment Manufacturers Information", February, 1988, and IBM Document #SA22-7085-01, "IBM System/370 Extended Architecture Principles of Operation", January, 1987, each of which are hereby incorporated by reference. If system processor 30 is an IBM AS/400 midrange computer, the connection could be made using a direct, SCSI interface attachment wherein library 1 is directly controlled by the host system according to ANSI standard X3T9.2/86-109 rev. 5, hereby incorporated by reference. If system processor 30 is a plurality of IBM PS/2 personal computers arranged in a LAN, the connection could be made using the NETBIOS control program interface of the IBM Token Ring Network LAN attachment, according to the protocols described in IBM Document #SC21-9526, "Distributed Data Management Level 2.0 Architecture Reference", March, 1989, hereby incorporated by reference. The preferred embodiment of library 1 will hereinafter be described as used as a file server in a LAN environment wherein library 1 appears to the system as a shared, general storage device.

System controller 17 is attached to drives 4, picker 5, and external optical disk drive 10 via known single-ended SCSI connections, including SCSI bus 31. In an alternative embodiment, system controller 17 may be similarly connected to another physical box to direct the operations of such other box, not shown in the drawing. The other box would be essentially identical to that shown in FIGS. 1-4, except that the other box would not physically include a system controller therein, but would instead be controlled by system controller 17 via SCSI bus 32. The logical subsystem including both physical boxes, one box with a system controller and one box without a system controller, is considered to be a single library. In addition, for use in certain environments, two system controllers can be connected via an RS-232 interface (not shown) to create a library including two boxes with system controllers and two boxes without system controllers, and so on.

Referring to FIG. 6, a functional component level description of system controller 17 will now be provided. Generally, system controller 17 is designed to support major library functions such as creating and deleting files, writing to and reading from the files, moving optical disks between storage cells 3, drives 4, and slot 9, and providing statistics on usage and errors. Volumes in the library appear as subdirectories in the root directory of a single drive. Labels assigned to each volume represent the subdirectory name. System processor 30 is able to read the root directory, but cannot store files in the root directory. Any paths accessed on a volume appear as paths under the subdirectory element that represents the volume label. Library 1 requires no instruction as to the physical location of the volume within library 1, the drive 4 in which to mount the volume, etc. Instead, system controller 17 makes all such determinations and directs the appropriate actions. Library management is thus transparent to users.

A generic library file server (GLFS) 50 controls the library with a set of generic, intermediate hardware commands through a formally defined interface which will be described later herein. Data is manipulated by GLFS 50 at the logical record level allowing for data access in quantities spanning from a single byte to complete, variable length data objects. An operating system 51 mediates the flow of control and directs incoming operating system commands from the external interfaces into the library subsystem. Operating system 51 can be any of several known operating systems and in the preferred embodiment is the OS/2 operating system. The use of the OS/2 operating system generally allows for control of library 1 through standard fixed disk operating system commands. Library control is directed through a unique command, DosFsCtl. This command is used to support initialization, entry/exit of an optical disk from library 1, read/store the library map file, mount/demount an optical disk in drive 10, enable/disable virtual drive option, etc. Drive control is directed through a unique command, DosDevIOCtl. The remainder of the programmed control for library 1 is retained in microcode which is uploaded into the main memory of system controller 17 from a storage medium resident therein at initialization. In alternative embodiments, some function required to support the microprogrammed control may also be provided as a utility to the operating system running in system processor 30.

The OS/2 operating system includes several advanced operating system concepts integral to system controller 17. These advanced concepts are dynamic link libraries, installable file systems, and multitasking. A dynamic link library (DLL) is a file containing a set of functions each of which may be dynamically loaded as needed. Normally, a program is compiled and linked with the compiled program code of all of the functions the program might invoke before it can be executed. A DLL permits a program to invoke functions compiled and linked into independent modules of program code OS/2 includes a set of DLL modules that can be invoked as required. Using a custom DLL module, OS/2 can be made to control non-standard storage devices. The custom DLL module is known as an installable file system (IFS). Each function supported by an IFS is known as an entry point. For additional information on installable file systems, see IBM Document #G362-0001-03, "IBM Personal Systems Developer", Fall, 1989, hereby incorporated by reference. In the preferred embodiment, GLFS 50 is implemented as an IFS to the OS/2 operating system with prescribed entry points.

Another important aspect of the OS/2 operating system is multitasking. Multitasking is the ability of a system to run multiple programs concurrently. The system processor's time is apportioned amongst tasks each appearing to be running as if no other tasks are present. A separate environment is maintained for each task; memory and register contents for each task are isolated to avoid interference with each other. A task and its associated environment is referred to as a "thread". Programs can include a code area and a data area in the main memory of the IBM PS/2 model 80 personal computer. The code area is the section of memory containing the instructions being executed for any given thread. The data area is the section of memory (or registers) that is manipulated during execution of the instructions. Because the same code area may be used for several threads, each thread may point to the same code area for execution but includes its own isolated data area.

The upper interface translator 80 is responsible for translating between upper interface commands and those of GLFS 50. The lower interface translator 90 is responsible for translating between the commands issued by GLFS 50 and those of the lower interface. Translators 80 and 90 are each implemented as distinct linkable modules with clearly defined interfaces, thereby permitting easy attachment of library 1 to new upper and lower interfaces. The only impact of attachment to a new interface is the creation of a new portion of translators 80 and 90—the generic nature of GLFS 50 allows it to remain unchanged.

The upper interfaces of library 1 include the library configuration, map, and system performance files, console 11 (and keyboard 12), and the network interface. The library configuration, library map, and system performance files are not shown in the drawing, but are stored on the fixed disk drive of system controller 17. These files are maintained by the library operator or maintenance personnel. The library configuration file lists various characteristics of the hardware configuration of library 1, such as the number of physical boxes in library 1, the number of drives 4 and 10 in each physical box, whether a drive is an internal drive 4 or an external drive 10, the number of storage cells 3 in each physical box, the SCSI addresses of each picker 5 and drive 4 or drive 10, etc. The library map file lists various characteristics of the optical disks in library 1, such as the volume label of each optical disk in library 1, the address of the home storage cell for each optical disk in library 1, free space information for each optical disk, and certain usage statistics for each optical disk, such as the number of mounts, the date and time of last access, etc. System controller 17 uses the library configuration and map files to identify the number and arrangement of resources in the library, and adjusts the files as the status of the resources in library 1 changes. The system performance file lists certain operator specified parameters not relevant to the present invention. Console 11 is used to exhibit the ongoing status of the library components and make commands and utility functions, such as error reporting, available to the operator. Keyboard 12 allows the operator to make manual input to library 1, such as in response to information received via console 11. Console 11 and keyboard 12 are linked to GLFS 50 by console driver 81 and console logical manager 83. The network is linked to LAN adapter driver 82 and NETBIOS network control program 84. The network interface allows a processor on the network to remotely gain access to library 1, which acts as a file server thereto.

GLFS request manager 52 is the interface to operating system 51 and responds to the same set of entry points that the OS/2 operating system uses to communicate with any IFS. GLFS request manager 52 is responsible for breaking down operating system commands to accomplish library functions, which it does by calling routines found in the process control manager (PCM) 53a to accomplish each step. PCM 53a is a set of utility routines, some of which require the generation of request blocks, that assist the system in breaking down and processing commands. The routines parse directory path strings, enter optical disks into the library, locate volumes, allocate drives to a volume, flip optical disks so as to present the volume on the opposite side for mounting, mount volumes, demount volumes, exit optical disks from the library etc. The directory management scheme (DMS) 53b is a module of code which satisfies the IFS file specification for monitoring the open/closed status of the user files in library 1, as is well known, and is used to manipulate such user files. Use of the IFS interface in such an internal module allows for easy adaptation of external IFS-style implementations of directory management schemes.

The power on initialization (POI) module 54 manages the power on and reset functions of the controller and is invoked by operating system 51 at initialization. POI module 54 is responsible for functions such as determining and reporting the results of component self-testing and reading the library configuration and status files. Errors are processed by an error recovery module 56 and an error logging module 57. Recovery module 56 processes all errors, including dynamic device reallocation and retries of device commands. Logging module 57 is responsible for saving error information and reporting it to the operator via console 11.

The resource manager 60 dynamically allocates and de-allocates control blocks in the data area of system controller 17, including request blocks, drive control blocks, and error information blocks. Request blocks are used to request a hardware event for drives 4 or picker 5. Drive control blocks are used to store status information relating to drives 4, as will be described later herein. Error information blocks are used to store the information needed to report, isolate, and possibly retry an error. The allocation and deallocation of control blocks is accomplished using a list of the free space available in the main memory of the IBM PS/2 model 80 personal computer maintained by resource manager 60. Note that both error recovery module 56 and resource manager 60 are connected to most of the components of system controller 17 shown in FIG. 6, such connections not being shown for simplification.

The schedulers 61 and 62 are responsible for verifying some of the contents of the request blocks and entering them into the pipe for the hardware device that will process the request. A pipe is a queued data path leading from one thread to another and can be accessed by any thread knowing the assigned identifier of the pipe. The dispatchers 63 and 64 are responsible for validating the request blocks, ensuring that the requests are ready to be executed, and dispatching the request as appropriate to the drive logical manager 91 and the library logical manager 92. The coordinator 65 is responsible for coordinating request execution for dispatchers 63 and 64. The coordinator accomplishes such using a table having an entry for each request block received from PCM 53a. Each entry lists the supporting request blocks associated with a particular request block. A request requiring the prior completion of another request is referred to as "dependent", the request that must first be completed is referred to as "supporting". Coordinator 65 withholds execution of dependent request until associated supporting requests have been executed. If a supporting request fails execution coordinator 65 rejects requests dependent thereon.

Logical managers 91 and 92 are responsible for translating the generic library commands in the form of request blocks into the equivalent device level commands in the form of SCSI data packets. Logical managers 91 and 92 are also responsible for receiving hardware status information from the drive driver 93 and the library driver 94 respectively. Drivers 93 and 94 directly manipulate the hardware and physical memory. Drivers 93 and 94 perform all communications with their respective hardware and also respond to interrupts. Logical manager 91 and drive driver 93 control drives 4, logical manager 92 and library driver 94 control picker 5. Although not shown in FIG. 6 for simplicity, there are actually multiple drive dispatchers 63, drive logical managers 91, and drive drivers 93—one set for each drive 4 or 10 in library 1. Each set is connected to a different data pipe.

Referring to FIG. 7, the internal data blocks passed to error recovery module 56 upon the detection of an error are shown. In library 1, the internal data blocks used for error recovery are the error information block created by the section of functional code encountering the error and the request block which initiated the operation of such code. In the drawing, the column to the left of the blocks shows the offset in bytes from the beginning of a block at which a particular field in the block begins. The column to the right of the blocks shows the size of the field. Any fields less than a byte in size are padded with zero bits when they are inserted into the system state, as will be described. In alternative embodiments, any number and size of data structures could be used, as required by the particular data processing system. The meaning and type of data in the fields is not important to the present invention, an overview of the fields shown in the drawing is provided herein merely as an example.

There are six fields in the twelve byte error information block. The first field is the error information block identifier. The error information block identifier begins in the first byte of the error information block and occupies three bytes thereof. The second field is the function field and identifies the code routine in system controller 17 that encountered the error condition. The function field begins at the fourth byte of the error information block (because the error information block identifier occupied the first three bytes thereof) and occupies one byte. The third field is the location field, which identifies the location at which an error occurs within the particular routine encountering the error. The fourth field in the error information block is the return code field, which identifies the result a request receives from a code routine not immediately capable of reporting an error to error recovery module 56. The return code field begins with the sixth byte of the error information block and occupies two bytes therein. The fifth field is the type field, which indicates the error type. The error type may be any one of five types. A resource error indicates that the operating system has denied a request for resources to support a particular function, such as not allocating memory for use by the function. A logic error indicates a fault in the implementation of the system code. The remaining three types of errors: library, drive, and card errors, correspond to errors of library 1, drives 4 and 10, and cards 13 and 18 respectively. The type field begins in byte 8 of the error information block and extends for four bits. The last field is the request block pointer field which is simply a pointer to the request block associated therewith, if one exists.

The fifteen byte request block includes eight fields. The first field of the request block is the request block name. The second field of the request block is the address or logical unit number of the device in which an error condition occurs and may also include the device type. For example, the device type may indicate whether a particular optical disk drive in the library is write-once or rewritable in nature. The third field is the command field which indicates the command being attempted when an error occurs. The return code field is analogous to that for the error information block. The fifth and sixth fields are the sense key and additional sense qualifier (ASQ) fields, which provide certain SCSI packet information for errors relating to drives 4 or 10 or library 1 only, as defined in the aforementioned SCSI standard. The last two fields are the SCSI status and CMD status fields, which provide certain information for errors relating to cards 13 and 18. The request block fields begin at bytes 0, 3, 7, 9, 11, 11, 12, 4 and 13 and extend for 3, 4, 2, 2, ½, ½, 1, and 2 bytes respectively.

A user editable data file contains much of the information needed for error recovery, as specified by the user. The data file is shown in FIG. 8, and is used to determine the system state and to provide the error states and their associated sequences of individual recovery actions. The drawing shows the contents of the data file, as specified by the user in a structure reference language, which is used to simplify data input. A small, sample data file is shown for convenience purposes as the amount of data actually in the data file is too large to show in its entirety. The data file contains two basic types of information, information relating to the system state and information relating to the error states and associated sequences of recovery actions.

The information related to the system state is a set of translation rules which are used to extract the relevant fields from the aforementioned blocks used in error recovery. Fields determined to be of no value in error recovery (during system development or use), no matter what their contents, are simply not specified for extraction. In addition, because the rules are in a user editable data file, a change to the definition of the system state is simple. The change to the definition of the system state allows for a change of the relevant fields used to define the system state variable. Additional or different error information can be collected for use by the error recovery code by simply changing the tables without changing the code, thereby, permitting easy field update without change or recompilation of the product code.

Each data field in the system state is derived using one rule. NUMRULES is used to specify the number of rules and thus the number of fields in the system state. Four rules are shown in the example, one per line. The number following a "D" indicates the displacement in bytes from the beginning of the block. The number following the "B" indicates the displacement in bits from the beginning of the specified byte. The number following the "L" indicates the number of bits to be extracted beginning from the specified bit. The extracted data is always padded to create a full byte or bytes. Applying the rules, one can see that the first rule in FIG. 8 specifies the entire function field of the error information block as the first byte in the system state. The second rule specifies the type field of the error information block as the second byte in the system state. The hyphen followed by the number "8" in the third and fourth rules specifies the pointer to the request block in the last field of the error information block. Thus, the third rule specifies the command field of the request block as the third byte in the system state and the fourth rule specifies the ASQ field of the request block as the fourth and last byte in the system state. The jump to each block is considered a "step". The first two rules specify one step each (to the error information block) and the last rules specify two steps each (to the error information block and then to the request block). The number of steps cannot exceed the number of blocks used.

The information related to the error states and associated sequences of individual recovery actions is essentially a table specifying such error states and indices to the associated individual recovery actions. NUMERRORS is used to specify the number of error states (as shown, 17). RSSIZE is used to specify the maximum number of individual recovery actions associated with any error state. This number includes a termination indicator, as will be described. The table lists one error state and its associated indexes per line. The error state is specified prior to the arrow; the indexes are specified thereafter in sequence order. Each of the items in the error state is a byte value corresponding to a byte value in the system state. The first byte of the error state corresponds to the first byte of the system state, the second byte of the error state corresponds to the second byte of the system state, etc. An "X" instead of a byte value is a "don't care" variable, meaning that such byte is not to be considered in comparing the error state to the system state. Thus, the first error state in FIG. 8 matches the system state if the first byte of the system state is 1 and the fourth and last byte of the system state is 7, regardless of the values of the second and third bytes of the system state. Similarly, the value of the fourth and last byte in the system state is of no consequence in matching the second error state to the system state. The use of don't care variables allows for a significant reduction in the number of error states which must be expressed and greatly increases the flexibility of the error state tables. In one embodiment, the last error state specified is a catch-all state (i.e. all don't care variables) to ensure that the system state matches at least one error state.

The recovery action indices specify individual recovery actions. Each possible individual recovery action for library 1 is listed by index in the recovery action array, to be described. The individual recovery actions are at the most elemental level at which recovery actions may be specified. The individual recovery actions combine to form the recovery action sequences used to recover from the associated error states. Thus, if the system state matches the first error state in the example shown in the drawing, the first five recovery actions are invoked for recovery. The termination designator indicates the end of the sequence of recovery actions. If the system state matches the second error state, the second, third, and fourth recovery actions are invoked for recovery. If the system state matches the third error state, the first and third recovery actions are invoked for recovery, and so on. Because the sequences of recovery actions are specified in a user editable data file the creation of a new sequence of recovery actions for a given error state as library 1 ages is made simple—the user simply revises the indices associated with an error state. Provisions are also made in the structured reference language for remarks and comments, not shown in the drawing for convenience.

METHOD OF OPERATION

Initialization of library 1 is accomplished using operating system 51, GLFS request manager 52, resource manager 60, and POI module 54. After self testing of the library hardware to verify correct function, operating system 51 is loaded and uses the OS/2 config.sys file to set the operating system parameters and load drivers. Operating system 51 then generates an initialization command which is passed to GLFS request manager 52 and then on to POI module 54. POI module 54 reads the library configuration, map, and system performance files, creates the necessary internal data structures in the main memory of the IBM PS/2 Model 80 personal computer, and initiates separate threads for each hardware component of library 1 specified in the library configuration file. Resource manager 60 initializes internal tables used in memory management. POI module 54 then queries system controller 17 and controller cards 13 and 18 for power on self-test results and reports any problems to error recovery module 56. Any errors detected during initialization are logged by error logging module 57 and, if possible, recovered by error recovery module 56. When system controller 17 is in a ready state, the system is receptive to activity from console 11 or the network interface.

The necessary internal data structures for error recovery are also created during initialization. These data structures are parsed out of the user editable data file and are shown in FIGS. 9 and 10. Although such data structures are not themselves actually user editable, they are considered user editable for the purpose of this invention as the data file from which they are parsed at initialization is indeed user editable. FIG. 9 shows the master control block for error recovery, including its common area 130. Common area 130 includes the number of translation rules, the size of a state variable, the number of error states, the size of an individual recovery action, and an array of pointers to the rule structures 131. There is one pointer per translation rule. Each rule structure 131 includes the byte displacement into the request block, bit displacement, bit length, and number of steps for the respective translation rule. Each rule structure 131 also includes an array of step structures, one step structure per step in the translation rule. Each step structure includes the type of field (pointer versus termination designator) and the byte displacement into the error information block.

The common area 130 of the master control block also contains pointers to the error table 132, care table 133, and recovery table 134. FIG. 10 shows these tables along with the system state and the recovery action array. The error table and care table essentially divide the error state information from the data file into two tables. The error table merely lists the error states in the order in which it is preferred that they be compared to the system state. The care table merely lists the mask of don't care variables which overlays the error table during comparisons with the system state. The care table is shown in hexadecimal format, the "0" bytes represent don't care variables. The system state is compared to the error state using corresponding lines in the error and care tables. In the first comparison, the 4 bytes of the system state (0, 2, 6, 7) are compared to 4 bytes in the first error state (1, 2, 6, 7). The care table indicates that the second and third bytes are don't cares, thus only the first and last bytes will determine if there is a match. Here, there is no match as the first byte of the system state and the first byte of the error state differ. In fact, proceeding down through the tables, the system state first matches the third error state. Although numerical values are shown in the system state and error table for convenience, these values are actually expressed in binary form therein (which is why a byte is used) and the comparisons are actually bitwise comparisons.

The recovery table effectively lists the recovery action index information from the data file. Each error state is assigned a recovery sequence. The recovery sequence is comprised of a sequence of recovery action indices padded at the end with zeros as required. The recovery action indices index into the recovery action array, which is also provided by the user and linked in at initialization. Each index corresponds to an actual elemental recovery action to be invoked for error recovery purposes (as part of a sequence of such actions). Such indexing allows the user to specify the elemental recovery actions in any order desired, regardless of how they were specified in the list of actions in library 1. The user simply chooses each index for a particular function so as to order the actions as desired.

Referring to FIG. 11, the basic operations of system controller 17 will now be described. When a request is received from the network interface, the network control code will convert the request into a set of standard OS/2 operating system commands at step 100. Operating system 51 will then issue the appropriate IFS operating system calls to process the operating system commands at step 101. GLFS request manager 52 receives the calls and breaks them down into simpler functions.

For each function, GLFS request manager 52 will call a routine PCM 53 and/or DMS 53B and pass the appropriate subset of the data required for the routine as parameters at step 102. For each routine requiring hardware activity, PCM 53A and/or DMS 53B at step 103 calls resource manager 60 to create a hardware level request block, issue such block to schedulers 61 and 62, and informs coordinator 65 of any hardware dependencies to allow for the proper sequencing of the request. PCM 53A also returns control and status information to GLFS request manager 52 as each routine is completed.

After checking the list of free space available in the main memory of the IBM PS/2 Model 80 personal computer, resource manager 60 allocates the required memory space for the request block. The routines calling resource manager 60 provide most of the information for a control block, resource manager 60 fills in certain additional information to the control block identifier and the request block identifier. Drive scheduler 61 and library scheduler 62 receive all hardware event requests as request block identifiers and forward them to the data pipes connected to drive dispatcher 63 and library dispatcher 64 respectively. Dispatchers 63 and 64 wait on their respective data pipe for the existence of a request block identifier. After receiving a request block identifier, dispatchers 63 and 64 call coordinator 65 to determine if the request block is ready to be executed. Coordinator 65 checks the table of request block dependencies and prevents dispatchers 63 and 64 from issuing the request block identifier until all supporting request blocks have been completed. When all request block dependencies have been met, the request block identifier is issued to the respective logical manager 91 or 92.

At step 104, logical managers 91 and 92 receive the request block identifiers, construct the necessary SCSI hardware command packets to accomplish the requests, and issue the packets to drivers 93 and 94. The hardware then physically performs the requests. As each request is completed logical managers 91 and 92 signal such completion. Dispatcher 63 or 64 then issues the identifier of the next request block to the respective logical manager 91 or 92.

Figure 12:
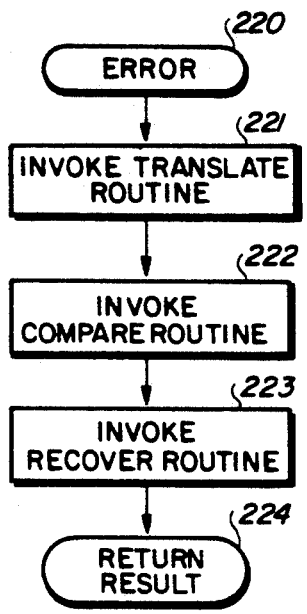
FIG. 12 is a high level flowchart of the operations of the error recovery subsystem of the invention.

If at any time during the aforementioned operations an error condition is encountered, error recovery module 56 is called. Referring to FIG. 12, error recovery module 56 is called when an error is discovered at step 220. The TRANSLATE routine is invoked at step 221 wherein error recovery module 56 receives the error information block and request block from operating system 51 and translates the information therein into a system state using the translation rules. The COMPARE routine is invoked at step 222 wherein the system state is compared to each of the error states in sequence until a match is found. The first match ends the comparisons; if more than one error state matches the system state, only the first match will be detected. By listing the error states in the order of degree of restriction (i.e. from those having the least number of don't care variables to those having the most number of don't care variables) of the associated sequence of recovery actions, it can be assured that the most specific possible sequence of recovery actions is attempted for recovery first. The RECOVER routine is invoked at step 223 wherein error recovery module 56 invokes the sequence of recovery actions for error recovery based upon the matched comparison state. At step 224, error recovery module 56 returns control to the calling function. The translate 221, compare 222, and recover 223 routines are shown in further detail in FIGS. 13-15.

Figure 13:
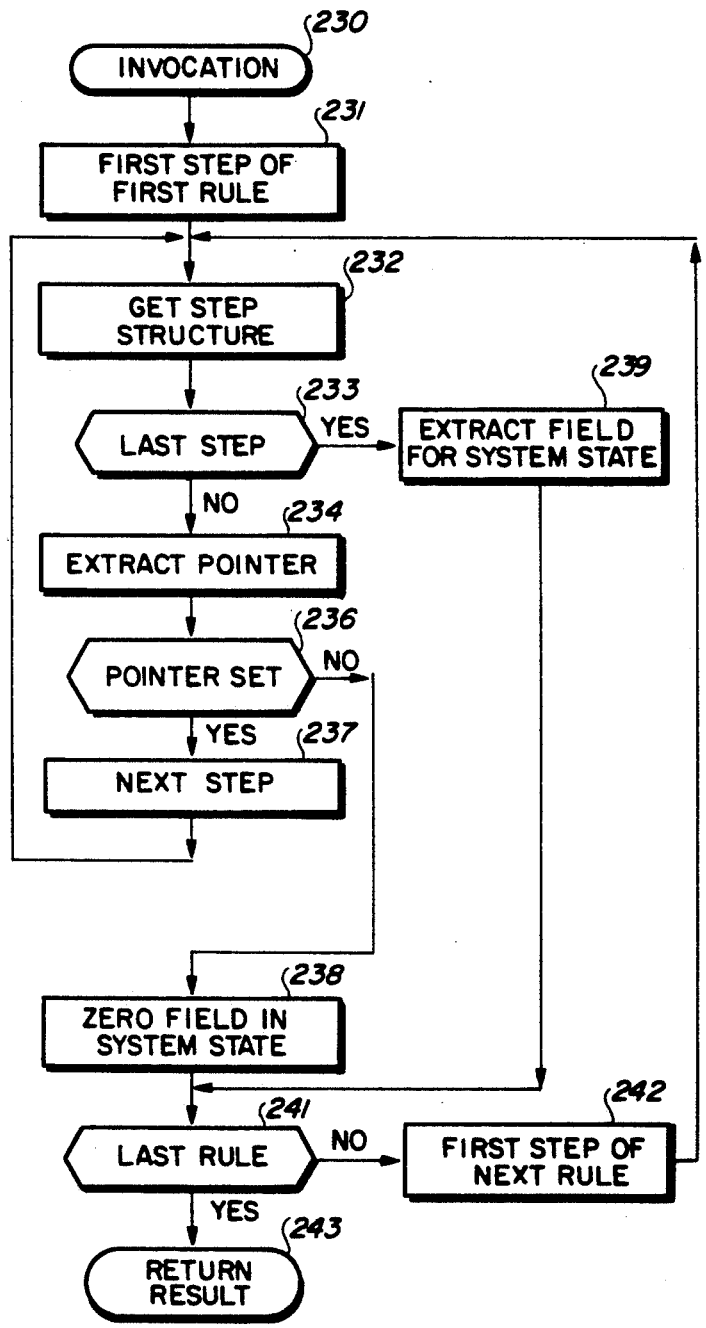
FIG. 13 is a flowchart of the translate routine called in FIG. 12.

Referring to FIG. 13, invocation of the TRANSLATE routine begins at step 230. At step 231, the first step of the first rule is considered. The step structure is retrieved at step 232 and step 233 branches according to whether the step is the last step. If not at the last step, the pointer to the request block is extracted at step 234. At step 236, branching occurs according to whether the pointer has been set. If so, the flow increments to the next step and returns to step 232 to get the new step structure. Such looping continues until the last step in the rule is located at step 233 or no data is found in the pointer at step 236. If the last step in the rule is located at step 233, the value of the field is extracted from the respective block at step 239 and placed in the current byte of the system state. If the pointer has not been set at step 236, a zero field is inserted into the current byte of the system state. When the pointer is not set, it implies that the data associated with that pointer is not required for the current system state (don't care variables are expressed for those fields). In either case, step 241 then branches according to whether the flow has cycled through to the last rule. If not, the flow is incremented to the first step of the next rule at step 242 and returns at step 232 to derive the next byte of the system state using such next rule. If through the last rule, the TRANSLATE routine returns at step 243.

Figure 14:
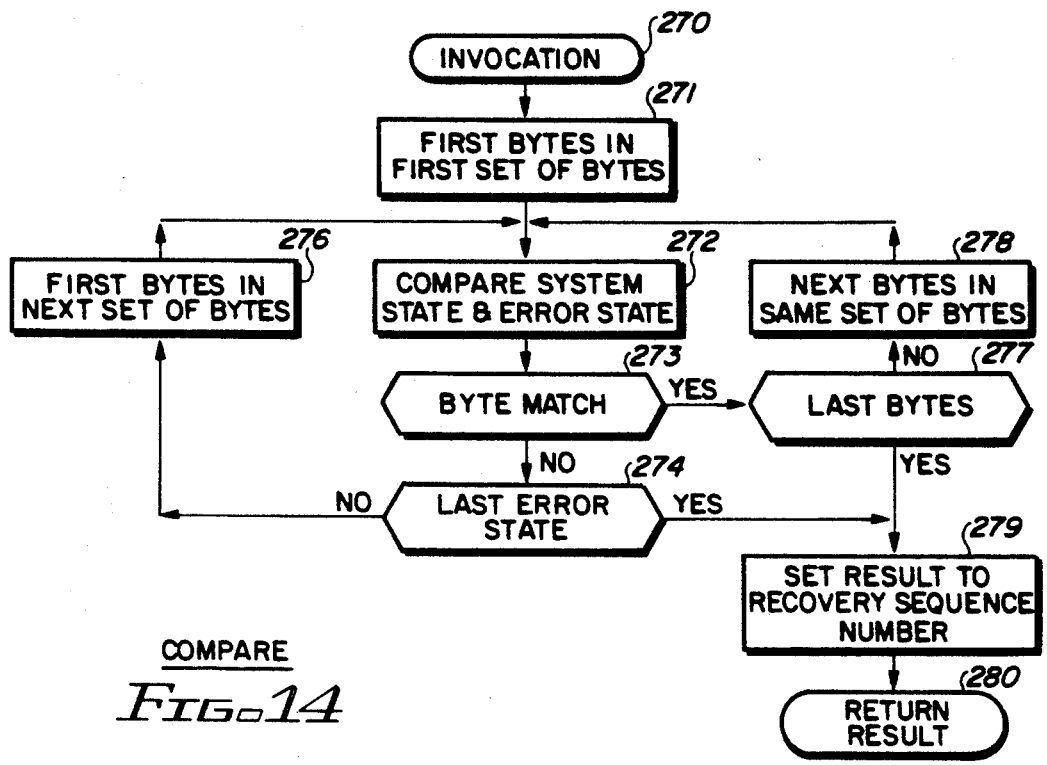
FIG. 14 is a flowchart of the compare routine called in FIG. 12.

Referring to FIG. 14, invocation of the COMPARE routine begins at step 270. At step 271, the first byte of the system state, the first byte in the error state in the error table, and the first byte in the care table are retrieved. At step 272 the bytes are compared by a first bitwise exclusive OR (XOR) operation on the system state byte and the error table byte followed by a bitwise AND on the XOR result and the care table byte. If the result is not an all-zero byte, there is no match and step 273 branches to step 274. Step 274 then branches according to the error state just compared. If the error state just compared (and not matched to the system state) is not the last error state, the flow increments to the first byte in the next error state in the error table and the first byte in the next error state in the care table and returns to step 272 to perform another comparison. Such looping continues until the bytes match at step 272 or the last error state is reached at step 274. Once the bytes match at step 273, step 277 branches according to whether the flow has reached the last bytes in the system state and the error state. If not, the flow is incremented to the next bytes in the same set of system state and error state bytes. If the last bytes have been reached, all prior bytes must have matched and the entire system state and error state is a match. The flow then continues at step 279. Once the last error state is reached at step 274, the flow again continues at step 279 to avoid endlessly looping back to step 272. At step 279, the recovery sequence index associated with the matched error state is saved and the COMPARE routine returns at step 280. In the embodiment wherein the last error state specified is a catch-all state, thereby ensuring that the system state matches at least one error state, step 274 can be removed as it is impossible to reach the last error state without having matched the system state and error state at step 273.

Figure 15:
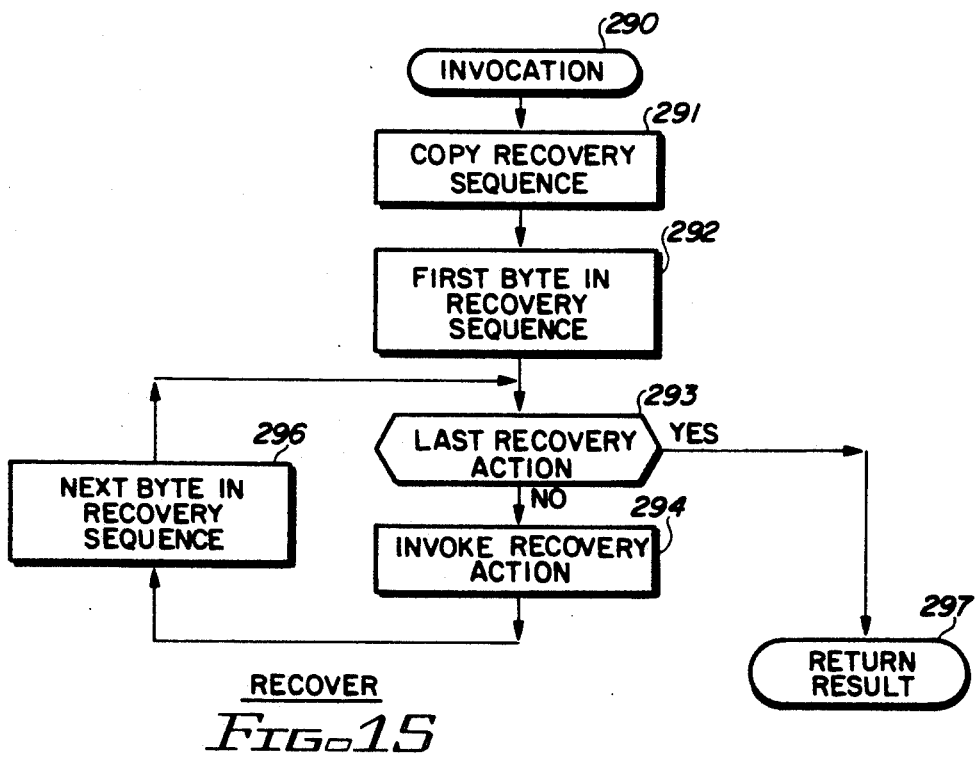
FIG. 15 is a flowchart of the recover routine called in FIG. 12.

Referring to FIG. 15, invocation of the RECOVER routine begins at step 290. At step 291, a copy is made of the sequence of recovery action indices using the saved recovery sequence index from step 279. At step 292, the first recovery action index in the sequence (i.e. the first byte) is extracted. Step 293 then branches according to whether the last recovery action has been reached (i.e. the recovery action index is the termination designation, zero). If not, the recovery action index is used to invoke the individual recovery action at step 294. The flow then increments to the next recovery action index in the sequence and returns to step 293. Such looping continues until the last recovery action has been reached at step 293, at which point the RECOVER routine returns at step 297.

While the invention has been described with respect to a preferred embodiment thereof, it will be understood by those skilled in the art that various changes in detail may be made therein without departing from the spirit, scope and teaching of the invention. For example, while the invention has been disclosed in the context of an optical disk library, similar consideration may make it equally applicable to other types of libraries or entire data processing systems or other components thereof. In addition, numerous variations in the libraries may be made such as the number of drives and storage cells. For example, in an alternate embodiment, library 1 includes 32 storage cells 3 and two drives 4. System controller 17 is located external to housing 2, which is of reduced size. Also, step 293 can be made to branch to step 297 under conditions in addition to those already mentioned. For example, if an individual recovery action in a sequence of such recovery actions is found to result in full recovery from the error at step 294, continuing to loop back through the remaining recovery actions is not necessary and thus inefficient. Similarly, step 293 can be made not to branch to step 297 under certain conditions, such as when repeating certain recovery actions is desirable. In addition, a recovery action may alter the contents of the current sequence of recovery actions being processed. The remaining features of library 1 are essentially unchanged. Accordingly, the invention disclosed herein is to be limited only as specified in the following claims.

What is claimed is:

1. An error recovery subsystem for use in a data processing system comprising
   a user editable file including rules for machine-executed definition of fields in a system state of the data processing system and including possible error states of the data processing system; and
   means for comparing the system state and the error states for invoking an appropriate sequence of recovery actions depending upon which error state matches the system state, the means for comparing and invoking coupled to the user editable file.

2. The error recovery subsystem of claim 1 wherein the user editable file includes a don't care variable to enable one of the error states to represent different possible states of the data processing system having the same appropriate sequence of recovering actions.

3. The error recovery subsystem of claim 2 wherein the user editable file includes sequences of recovery action indices, the indices indexing into a list of individual recovery actions for the data processing system.

4. The error recovery subsystem of claim 2 wherein one of the error states includes all don't care variables.

5. The error recovery subsystem of claim 1 wherein the user editable file includes sequences of recovery action indices, the indices indexing into a list of individual recovery actions for the data processing system.

6. The error recovery subsystem of claim 1 wherein the rules only define fields in the system state relevant to a comparison of the system state to at least one error state.

7. An error recovery subsystem for use in an automated storage library comprising:
- a user editable file including rules for machine-executed definition of fields in a system state of the automated storage library, including possible error states of the automated storage library using at least one don't car variable, and including sequences of recovery action indices, the indices indexing into a list of individual recovery actions for the automated storage library; and
- means for comparing the system state and the error states and for invoking a sequence of recovery actions depending upon which error state matches the system state, the means for comparing and invoking coupled to the user editable file.

8. The error recovery subsystem of claim 7 wherein the rules only define fields in the system state relevant to a comparison of the system state to at least one error state.

9. The error recovery subsystem of claim 7 wherein one of the error states includes all don't care variables.

10. A method for recovering from an error in a data processing system comprising machine-executed steps of:
- determining a system state of the data processing system;
- comparing the system state to possible error states; and
- invoking a sequence of recovery actions depending upon which error state matches the system state using a sequence of recovery action indices, the indices determined according to which error state matches the system state and indexing into a list of individual recovery actions for the data processing system.

11. The method of claim 10 wherein the sequence of recovery actions can be modified by a recovery action.

* * * * *